(12) United States Patent
Durkee et al.

(10) Patent No.: US 8,881,214 B2
(45) Date of Patent: Nov. 4, 2014

(54) INTERACTIVE TELEVISION NETWORK AND METHOD INCLUDING CONTENT SEARCHING

(75) Inventors: James R. Durkee, Denver, CO (US); David Crawford Gibbon, Lincroft, NJ (US); Behzad Shahraray, Freehold, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 50 days.

(21) Appl. No.: 13/313,357

(22) Filed: Dec. 7, 2011

(65) Prior Publication Data

US 2012/0084822 A1 Apr. 5, 2012

Related U.S. Application Data

(63) Continuation of application No. 09/848,581, filed on May 3, 2001, now Pat. No. 8,108,892.

(51) Int. Cl.
*H04N 7/173* (2011.01)

(52) U.S. Cl.
USPC ............................................. 725/109; 725/93

(58) Field of Classification Search
USPC .................... 725/32, 51, 53, 93, 109
See application file for complete search history.

(56) References Cited

U.S. PATENT DOCUMENTS

| | | |
|---|---|---|
| 4,598,385 A | 7/1986 | Kessels et al. |
| 4,792,849 A | 12/1988 | McCalley et al. |
| 5,459,530 A | 10/1995 | Andersson et al. |
| 5,481,542 A | 1/1996 | Logston et al. |
| 5,539,822 A | 7/1996 | Lett |
| 5,589,892 A | 12/1996 | Knee et al. |
| 5,592,551 A | 1/1997 | Lett et al. |
| 5,594,509 A | 1/1997 | Florin et al. |
| 5,606,374 A | 2/1997 | Bertram |
| 5,619,250 A | 4/1997 | McClellan et al. |
| 5,710,591 A | 1/1998 | Bruno et al. |
| 5,751,282 A | 5/1998 | Girard et al. |
| 5,754,940 A | 5/1998 | Smith et al. |
| 5,870,155 A | 2/1999 | Erlin |
| 5,874,986 A | 2/1999 | Gibbon et al. |
| 5,905,521 A | 5/1999 | Gatto et al. |
| 5,929,850 A | 7/1999 | Broadwin et al. |
| 5,987,154 A | 11/1999 | Gibbon et al. |
| 6,003,019 A | 12/1999 | Eaton et al. |
| 6,005,565 A * | 12/1999 | Legall et al. .................. 715/721 |
| 6,014,636 A | 1/2000 | Reeder |
| 6,098,082 A | 8/2000 | Gibbon et al. |
| 6,124,854 A | 9/2000 | Sartain et al. |
| 6,182,287 B1 * | 1/2001 | Schneidewend et al. ....... 725/48 |
| 6,563,547 B1 | 5/2003 | Smith |
| 7,237,253 B1 * | 6/2007 | Blackketter et al. ............ 725/61 |
| 2001/0016947 A1 | 8/2001 | Nishikawa et al. |
| 2001/0030959 A1 | 10/2001 | Ozawa et al. |
| 2002/0112007 A1 | 8/2002 | Wood et al. |
| 2003/0101459 A1 * | 5/2003 | Edson .............................. 725/82 |

\* cited by examiner

*Primary Examiner* — Hunter B Lonsberry
(74) *Attorney, Agent, or Firm* — Banner & Witcoff, Ltd.

(57) ABSTRACT

The present invention is directed to content searching of various databases in an interactive television network; caching programming for rebroadcasting to interactive television network subscribers; and interactively offering goods and services referred to in broadcast programming to interactive television network subscribers.

20 Claims, 5 Drawing Sheets

INTERACTIVE TELEVISION NETWORK AND METHOD INCLUDING CONTENT SEARCHING

FIELD OF THE INVENTION

The present invention relates generally to interactive television networks and specifically to interactive television networks that provide data searching.

BACKGROUND OF THE INVENTION

Recent developments in digital signal processing techniques, such as digital compression techniques and multimedia content indexing techniques, have enabled a variety of new digital services to be provided to a cable subscriber's home through existing telephone and coaxial cable lines. A large number of cable or CATV channels are now provided to customers by compressing digital video, transmitting the compressed digital video over conventional coaxial cables, and decompressing the video at the customer's set top terminal. For example, video-on-demand enables a user or subscriber to search through metadata, such as the program title, to locate desired programming.

Interactive cable television systems have been implemented to provide enhanced subscriber programming services. "Interactive television" refers to a cable television network in which the subscriber can communicate with the network operator and/or a computational component, through the same communication medium used to provide broadcast streams to the subscriber. By way of example, "movie on demand" video systems are now in use in which a subscriber communicates directly with a video service provider over coaxial cables to request a particular video program from a video library, and the requested video program is thereafter routed to the subscriber's home. Web TV™ has been implemented which permits a subscriber to access the internet but not resources within the cable network.

While there is a tremendous need for interactive television, the implementation of interactive television has been restricted to specific services and/or features. There is a need for an interactive television system that permits cable network subscribers not only to access freely other data networks but to access freely components located within the interactive television network itself.

SUMMARY OF THE INVENTION

These and other needs are addressed by the various embodiments of the present invention.

In the first embodiment, an interactive television (ITV) network is provided. The network includes:
  (a) a data locator in communication with a set-top terminal for locating data; and
  (b) one or more memories containing at least three of the following data accessible by the data locator:
    (i) television listing data containing broadcast programming scheduling information relating to past, current, and future scheduled programming over the interactive television network;
    (ii) programming content data containing audio and video content of previously broadcast programming on the interactive television network;
    (iii) e-mail data containing e-mail for interactive television network subscribers; and
    (iv) subscriber voice mail database containing voice mail information for interactive television network subscribers telephones. The set-top terminal is connected to a television, accesses other network components, and provides ITV broadcast programming to ITV subscribers.

Television listing data can include for each program a title, a broadcast channel, a broadcast time, a broadcast duration, a program content description (e.g., a keyword or group of words), program category (e.g. sports, news, etc.), other air times, and a program rating.

The programming content data includes not only digital video information but also digital audio information. The digital audio and video information is typically part of a multimedia broadcast stream to interactive television network subscribers. The digital audio information can, for example, be a transcription of the audio content, such as closed caption information provided as part of the multimedia stream, digital information that is transcribed using speech recognition techniques, and the like. The digital video information can be initially in digital form or initially in analog form and digitized by known techniques. Although it is possible to search the programming content data using predefined configurations or arrangements of video information as described in U.S. Pat. Nos. 5,459,530 and 5,987,154, to Gibbon, et al., which are incorporated herein by this reference, in typical applications the search would be conducted through the digital audio information. Corresponding video information to the located audio information could then be delivered to the subscriber.

The subscriber voice mail is transcribed using voice recognition techniques. The voice mail would be provided to the interactive television network through the local telephone service provider.

In various configurations, the interactive television network includes other types of information for access by ITV subscribers. For example, the interactive television network includes billing data for network subscribers, help data to respond to questions of network subscribers, personal information for each network subscriber, and calendar information for each network subscriber. Personal information includes a payment method, credit card information, debit card information, the network subscribers name and (mailing) address, telephone number information, and a history of purchases for each network subscriber.

In another embodiment, a method is provided for replaying a multimedia stream to an interactive television network subscriber. The replay can be in the form of a broadcast, unicast, and/or multicast. In the method, at least a portion of the programming is recorded in memory during the replay of the programming, one or more requests are received from network subscribers to replay the programming, the programming is retrieved from memory, and the multimedia stream replayed to one or more network subscribers to provide broadcast quality video. In one configuration, the multimedia stream or programming is only recorded or cached provided a specified number of interactive television network subscribers request the recording. In another configuration, the multimedia stream or broadcast programming is only replayed if the interactive television network operator receives at least a specified number of replay requests for the program.

In another embodiment, a method for using interactive television network is provided that includes the following steps:
  (a) providing a multimedia broadcast stream to a set-top terminal, the broadcast stream containing a network address;
  (b) rendering a first picture on a television containing at least one bug associated with the network address;
  (c) receiving a signal from a network subscriber relating to the bug; and (d) performing a predetermined action in response to receipt of the signal.

The network address could be a universal resource locator, a pointer to another channel, and the like. As will be appreciated, a bug is a single graphic overlay on the video stream.

In an exemplary configuration, the performing step includes: rendering a second picture on the television presenting information related to the bug and providing the information to a network component. The performing step can also include overlaying graphics on the video stream, changing channels and polling. The multimedia broadcast stream could be of any type, such as a program or advertisement from a vendor. In one configuration, an electronic form is completed by logic in the set-top terminal (or another interactive television network component) and the completed or partially completed form rendered as part of the second picture on the television. In this configuration, personal information associated with the interactive television network subscriber is included in the at least partially completed form. The subscriber may edit the partially completed form and/or complete specified fields in the form. A confirmation request can be included in the second picture to signify confirmation or acceptance by the subscriber of the purchase agreement.

DETAILED DESCRIPTION

Figure 1:
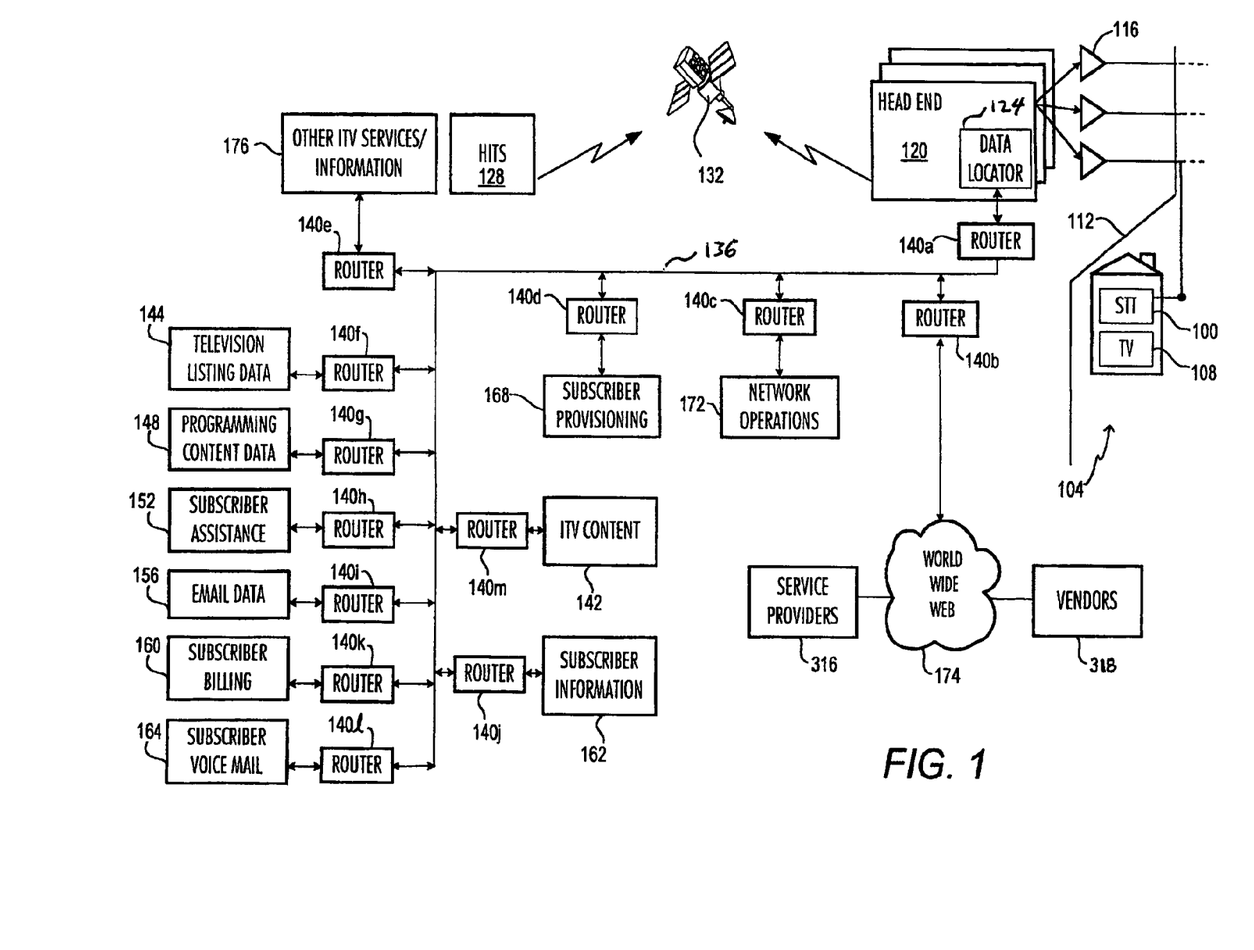
FIG. 1 depicts an interactive television network according to an embodiment of the present invention.

FIG. 1 depicts an interactive television network according to an embodiment of the present invention. A set-top terminal ("STT") 100 is provided within the subscriber's home 104 for communication with the other components of the network. STT 100 preferably has a modem, a processor, logic (namely an operating system, video decoder, and other application software), and volatile and nonvolatile memory for controlling the presentation of the received data to the subscriber's television 108 or other information presentation device and providing a communications path between the interactive television network subscriber and other network components.

A plurality of STTs 100 are connected across a common bi-directional communication link 112 to one of a plurality of broadband amplifiers 116. Amplifiers 116 receive analog or digital signals from a corresponding head end 120 and provide an amplified signal to the STT 100 for presentation to the subscriber.

Head end 120 includes a data locator 124 for identifying the network components to receive the subscriber communications particularly interactive television network content search requests, directing subscriber communications to the proper network components, and configuring the communications for the network components to receive the request. Data locator can include one or more applications such as a suitable type of domain name service (which resolves domain names to data (or IP) addresses and vice versa) and/or a suitable search engine known to those of skill in the art.

As will be appreciated, head end 120 receives broadcast program signals from a suitable signal transmission architecture such as satellite transmission architecture known as the head end in the sky or HITS 128 using a satellite 132. Head end 120 will therefore include a number of other components such as a cable modem termination system, signal combiner router, modulator, and IP gateway (not shown) known to those of skill in the art. As will be appreciated, any suitable protocol can be used to forward signals from the STT 100 to the cable modem termination system (not shown) in head end 120. Examples of suitable protocols include DOCSIS, TCP/IP, and HTTP.

The data locator 124 can forward signals to the other components in the network using any of a number of protocols. Examples of suitable protocols include the TCP/IP suite of protocols, XML (i.e., extensible mark-up language), LDAP (i.e., Light-Weight Directory Protocol), SQL (i.e. Structured Query Language), WTVP (i.e., Web TV Protocol), HTTP (i.e., hypertext transport protocol), HTML (i.e., hypertext markup language), DLLs (i.e., dynamic link libraries), ODBC (i.e., Open Database Connectivity), RDBMS (i.e., remote data base management system), RDO (i.e., Remote Data Objects), ADO (i.e., Active-X Data Objects), and CORBA (i.e. Common Object Resource Broker Architecture).

Communication line 136 can be wireless or any suitable wired medium for conveying the signals among the network components. Examples of suitable wired media include coaxial cables such as hybrid fiber cable ("HFC"), twisted-pair, fiber-optic cable, wireless and the like.

A plurality of routers 140a-m determine the appropriate path a signal or a portion of a signal such as a packet takes to reach its destination. Routers 140a-m can employ any routing protocol that is compatible with the particular network protocol(s) used.

The network provides connectivity to a number of service and/or information network components. These network components include interactive television network content 142, television listing data 144, programming content data 148 subscriber assistance 152, email data 156, subscriber billing 160, subscriber information 162, subscriber voice mail 164 subscriber provisioning 168, network operations 172, other data networks such as the World Wide Web 174, and other interactive television network services/information 176 discussed below.

Subscriber provisioning 168 is discussed in detail in U.S. patent application Ser. No. 09/671,329, to Donlan et al., entitled "METHOD AND APPARATUS FOR MANAGING THE PROVISIONING OF CLIENT DEVICES CONNECTED TO AN INTERACTIVE TV NETWORK", filed Sep. 26, 2000; Ser. No. 10/287,097, to Donlan et al., entitled "METHOD AND APPARATUS FOR REMOVING CLIENT FROM AN INTERACTIVE TV NETWORK", filed Nov. 4, 2002; and Ser. No. 10/287,330, to Donlan et al., entitled "METHOD AND APPARATUS FOR PROVISIONING CLIENT DEVICES CONNECTED TO AN INTERACTIVE TV NETWORK", filed Nov. 4, 2002, each of which is incorporated herein by this reference and assigned to the assignee of the present application.

Network operations 172 monitor computers, network, applications, and STTs so that failures or unusual behavior are noticed immediately; install new applications and upgrades; schedule and conduct maintenance and upgrades; and create and populate data centers.

The remaining interactive television network components are discussed below with reference to FIGS. 1 and 2.

Figure 2:
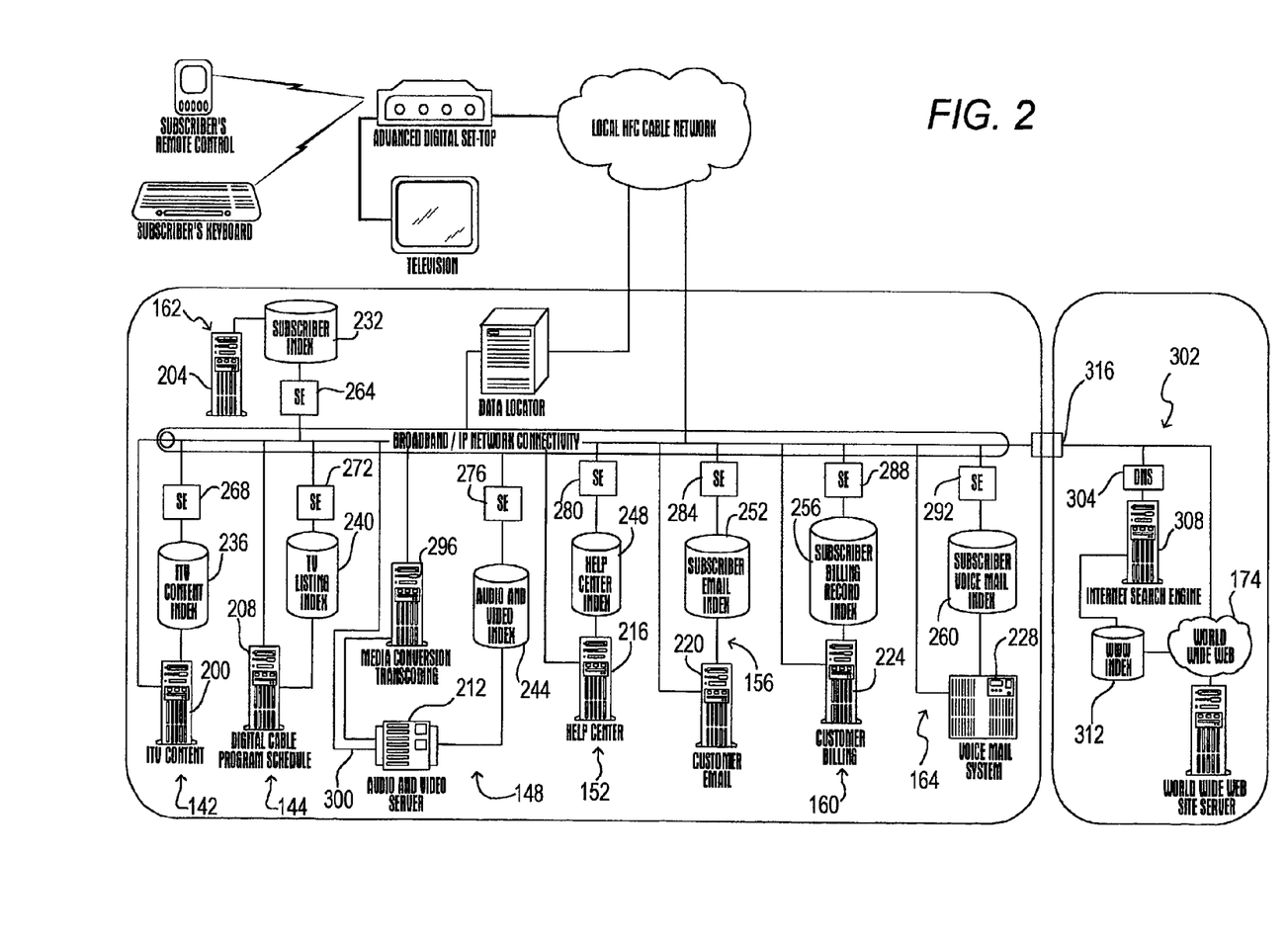
FIG. 2 depicts a portion of the interactive television network of FIG. 1.

Referring to FIGS. 1 and 2, each of the network components 142, 144, 148, 152, 156, 160, 162, and 164 includes a corresponding data server that includes data storage, namely interactive television network content server 200, interactive television network subscriber information server 204, television listing server 208, programming content server 212, subscriber assistance server 216, subscriber email server 220, subscriber billing server 224, and subscriber voice mail server 228, respectively. Each of the servers 200, 204, 208, 212, 216, 220, 224, and 228, have a corresponding index, namely subscriber index 232, interactive television network content index 236, television listing index 240, audio and video index 244, subscriber assistance index 248, subscriber email index 252, subscriber billing record index 256, and subscriber voice mail index 260, respectively, providing location or mapping information for data in the corresponding server's data storage and a corresponding search engine 264, 268, 272, 276, 280, 284, 288, and 292, respectively, to perform searches in the corresponding index and server data storage. The servers, indices, and search engines can be implemented using any of a variety of configurations known to those skilled in the art. One or more application program interfaces interface the subscriber application with the various search engines. As will be appreciated, the servers may be combined for a number of applications. For example, a common server may service multiple applications.

Interactive television network subscriber information server data storage 204 contains personal data related to each interactive television network subscriber. For example, the database 204 can include interactive television network subscriber financial information, such as name, address, credit card number, credit card expiration, debit card number, etc., for each interactive television network subscriber, interactive television network subscriber address information for selected entities (or electronic address book) for each interactive television network subscriber, and electronic calendar information for each interactive television network subscriber.

Interactive television network content server data storage 200 contains data related to the identifications of the various interactive television network components or interactive offerings, the types of services, goods, and/or information offered by the components or offerings that are part of the interactive television network, the network addresses of the various components or offerings, metadata, keyword data, XML data, and category data. The interactive television network content database 200 commonly does not include such data for the internet (e.g., the world wide web 174). The search engine 268 will provide resulting entries containing a description of network components responsive to the subscriber's search request along with a description and indications of the data locations where the result was found.

Television listing server data storage 208 contains for each program (whether already broadcast, being broadcasted, or to be broadcast) a title, a broadcast channel, a broadcast time, a broadcast duration, a program content description (e.g., a keyword or group of words), a program category (e.g., sports, news, etc.) and program rating.

Audio and video server data storage 212 contains broadcast quality audio and video programming information for the programs broadcast by the interactive television network indexed by program. The audio programming information can be transcribed using voice recognition techniques, closed caption information embedded in the video stream, meta data such as meta description data and/or meta key word data, offline transcription, post production script, and combinations thereof. Index 244 typically provides the data location information for each program. The creation, maintenance, and browsing of the data storage 212 and the retrieval of audio or video information from the data storage 212 is described in U.S. application Ser. No. 09/552,312 to Basso et al., entitled "BROWSING AND RETRIEVAL OF FULL BROADCAST-QUALITY VIDEO", filed Feb. 19, 2000, U.S. application Ser. No. 09/240,601, to Gibbon, entitled "Generating Hypermedia Documents from Transcriptions of Television Programs Using Parallel Text Alignment", filed Feb. 1, 1999; U.S. application Ser. No. 09/353,192 to Huang et al. entitled "Automated Generation of News Content Hierarchy by Integrating Audio, Video, and Text Information" filed Jul. 14, 1999; U.S. Pat. No. 5,710,591 to Gibbon et al. entitled "Method and Apparatus for Recording and Indexing Multimedia Conferences/Meetings" and U.S. Pat. No. 6,098,082, to Gibbon et al., entitled "METHOD FOR PROVIDING A COMPRESSED RENDITION OF A VIDEO PROGRAM IN A FORMAT SUITABLE FOR ELECTRONIC SEARCHING AND RETRIEVAL, each of which is incorporated herein by this reference and assigned to the assignee of the present application.

Transcoder 296 can be provided to alter the appearance or the sizing of the digital programming provided to the subscriber. For example, each subscriber can have a differently configured STT, which may require transcoder to alter the font fields in the digital programming information provided to the subscriber. In some applications, the programming information is not transcoded as shown by communication line 300, which bypasses transcoder 296. The communication of the programming information to the interactive television network subscriber is described in more detail in U.S. Pat. No. 5,874,986, to Gibbon et al., entitled "METHOD FOR COMMUNICATING AUDIOVISUAL PROGRAMS OVER A COMMUNICATIONS NETWORK", which is incorporated herein by this reference and assigned to the assignee of the present application.

Subscriber assistance server data storage 216 includes information to assist the subscriber in using the interactive television network, such as answering questions of the subscriber. Customer support personnel can also interact electronically with interactive television network subscribers through appropriate software interfaces.

Subscriber email server data storage 220 includes email received for each interactive television network subscriber indexed by subscriber. Email index 252 contains the locations of the email information for each interactive television network subscriber. Email database can include not only email received from other interactive television network subscribers but also email received from subscribers on the internet, who may not be interactive television network subscribers. Application software permits an interactive television network subscriber to create, search, send, receive, forward, reply, save, retrieve, delete and print emails and receive and forward email attachments including picture files, web links, and embedded HTML.

Subscriber billing server data storage 244 includes billing information for each interactive television network subscriber for use of the interactive television network or other services. For example, the billing system could include not only billings for interactive television network service usage but also billings for telephone or internet usage. Each subscriber can therefore access and view his or her billing information, whether current or historical. Subscriber billing data storage is maintained by network operator personnel and suitable software applications.

Subscriber voice mail server data storage 228 includes digitized voice mail for each interactive television network subscriber. The analog voice mail is transcribed using voice recognition techniques to form the digitized voice mail.

Internet 302 is connected to interactive television network via a domain name system 304 that maps domain name to internet addresses and internet search engine 308 performs searches for interactive television network subscribers in index 312 to locate internet content, such as a server of a service provider 316 and/or vendor 318 on the world wide web 174. Examples of suitable search engines include YAHOO™, DOG PILE™, ALTA VISTA™, EXCITE™, NETSCAPE™, ASK JEEVES™, GO TO™, HOTBOT™, LOOK SMART™, LYCOS™, GOOGLE™, AOL Search™ and an aggregator of the output other Internet searches such as DOG PILE™. Typically, the software interface with the internet will provide the interactive television network subscriber with entries responsive to a search request along with a description and indication of the database(s) where results were found. A firewall 316 and/or any other suitable or security measures protect the interactive television network from unauthorized internet traffic and other undesired use by internet subscribers.

Finally, other interactive television network services/information 176 (FIG. 1) can be any number of information sources, service providers, and/or vendors that are part of the interactive television network. For example, service providers can be providers of pay-per-view services, video-on-demand and the like. Vendors can be retailers offering for sale or lease goods to interactive television network subscribers.

Figure 3:
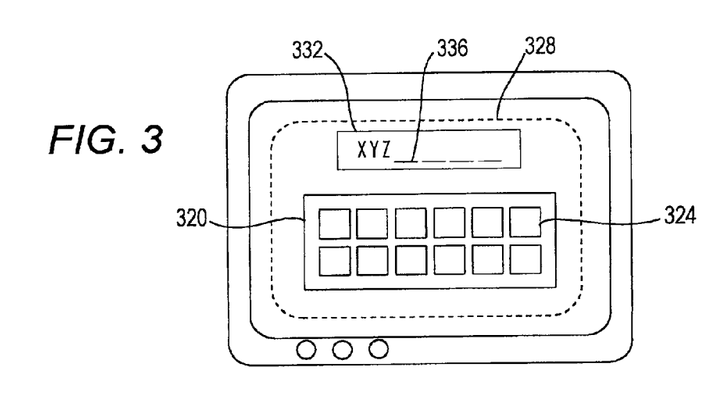
FIG. 3 depicts a virtual keyboard according to another embodiment.

The network subscriber can use a number of different techniques to generate a search request or otherwise create a text message for transmission by the STT to another network component. As shown in FIG. 2, the subscriber uses a remote control, a physical keyboard, and the like to enter the message text. FIG. 3 shows a virtual keyboard 320 that can be rendered on the television screen for use in conjunction with a remote control or other television control device. The keyboard 320 includes a number of virtual keys 324 and is displayed in the title safe area 328 of the television screen. The remote control keys are mapped to the keys of the virtual keyboard. As the subscriber presses an appropriate button of the remote control (or highlights the letter and enters the letter as a keystroke), a corresponding letter or number appears in the text area 332 displayed in another portion of the title safe area 328. Blanks 336 are displayed to indicate locations for text yet to be entered. Scroll commands can be used to move forward or backward through the entered text if the text length exceeds the length of the text area 332. Alternatively, voice recognition could be used to enter the search request text for the subscriber.

The foregoing architecture enables a variety of services to be provided to an interactive television network subscriber.

Figure 4:
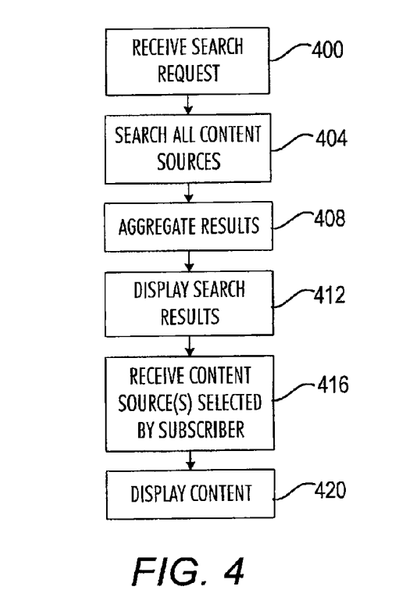
FIG. 4 depicts a search methodology according to another embodiment.
Figure 5:
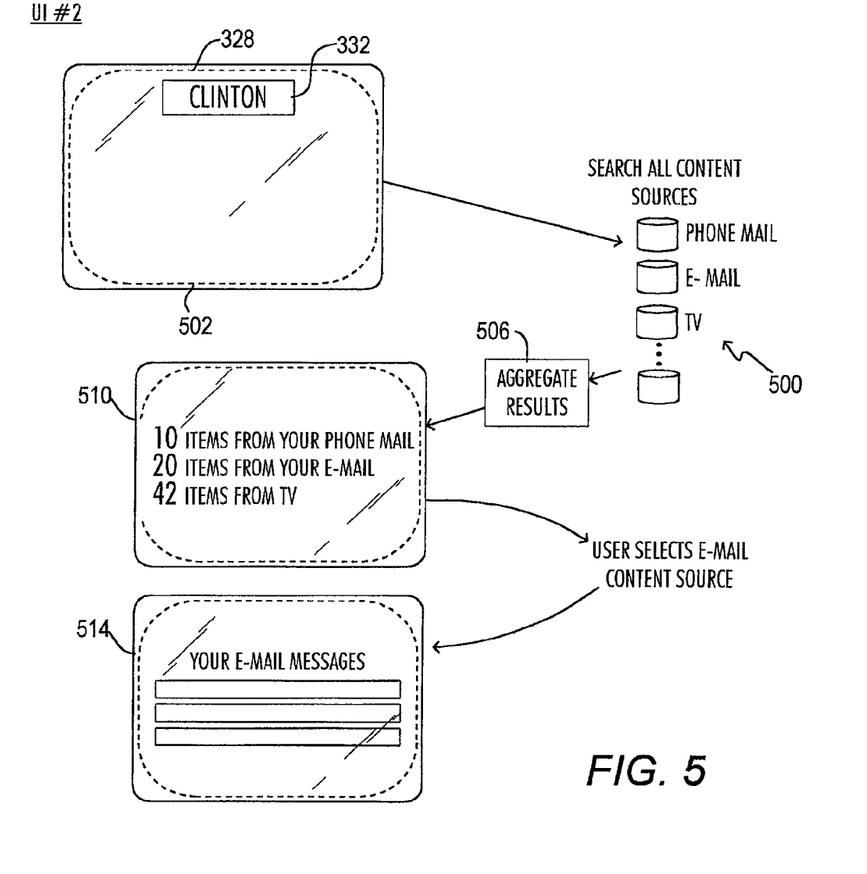
FIG. 5 depicts the various steps of FIG. 4 in another format.

In one embodiment, the architecture permits an interactive television network subscriber to perform content searching using one or more of the various network components. For example, the interactive television network subscriber could determine what programs have been, are being, and/or will be presented on the interactive television network regarding a particular topic or subject, locate a desired interactive television network component, review his or her billing information, and/or peruse his or her e-mail and/or voice mail. FIGS. 4 and 5 illustrate a series of commands performed by data locator 124 in response to a search request.

In box 400 (FIG. 4), a search request is received from an interactive television network subscriber. FIG. 5, for example, shows a search term "CLINTON" on the TV display 502 that has been entered by the interactive television network subscriber. The search request is than transmitted to the subscriber's STT 100 and then to the data locator 124. The data locator 124 places the search request in the proper format and syntax for each of the search engines to be contacted and the various requests are then routed to all of the search engine(s). Alternatively, each of the search engines can be responsible for placing the search request in the proper format for the corresponding data storage.

In box 404 of FIG. 4 and in step 500 of FIG. 5, the various search engine(s) search through the corresponding index and data storage to locate information, if any, responsive to the entered request. The search results are aggregated in box 408 (or in step 506) by the data locator 124, and the data locator 124 forwards the search results in the proper scripting language to the corresponding STT 100 for presentation to the interactive television network subscriber. A sample of the display is shown in FIG. 5 as TV display 510. The display 510 shows that a search on the word "CLINTON" has located 10 items from the subscriber's phone or voice mail, 20 items from his e-mail, and 42 items from programming content data or "TV". The interactive television network subscriber scrolls through the aggregated search results, selects the results of interest, and causes the STT 110 to forward the various selections to the data locator 124. In step 514 of FIG. 5, the subscriber has selected his e-mail for review. The data locator 124 in box 416 receives the content source(s) selected by the interactive television network subscriber, retrieves or locates the information associated with the selected content source(s), and forwards the information or the network location of the located data to the subscriber. The pertinent information is then displayed in box 420 in a predetermined or user selected order to the interactive television network subscriber. If the information is forwarded directly to the subscriber, the information is downloaded to the STT 100 and displayed. If the information location is forwarded to the subscriber, the subscriber communicates directly with the server accessing the data storage and sequentially downloads the information during viewing of the information. In either event, the subscriber could forward the information location (or network address) or information itself to another interactive television network subscriber via email as an attachment or via some other electronic interface, if desired. The subscriber could view retrieved video or written information and hear any corresponding audio information over his or her television or hear retrieved voice mail messages over his or her television.

FIG. 5 shows the display when the subscriber selects the twenty items from his email as shown in television display 514. As will be appreciated, the subscriber could initially configure the search to review the entire voice mail message or only those portions of the message containing the search term(s). The same is true for other types of information searched by the subscriber. In this methodology, a pointer to a time stamp in the multimedia stream would be employed to permit the subscriber to go directly to the point in the multimedia stream where the search term(s) had a match.

Figure 6:
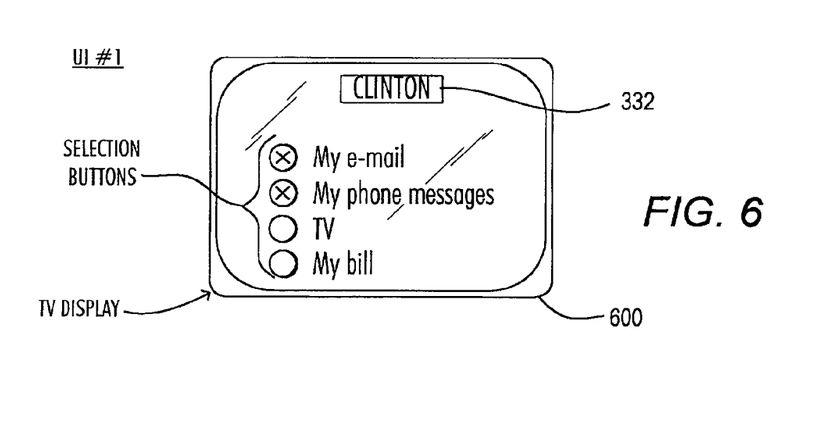
FIG. 6 depicts an alternative methodology for initiating a content search.

FIG. 6 depicts an alternative search methodology to the methodology described above. As shown in display 600, the subscriber types in the search word "Clinton" in text area 332 and then selects which of the various data servers is to be searched. In the display 600, the subscriber has selected his email and phone messages for searching but not the programming content (TV) or subscriber billing (my bill). In this configuration, the data locator 124 would only forward the search request to the selected databases.

Figure 7:
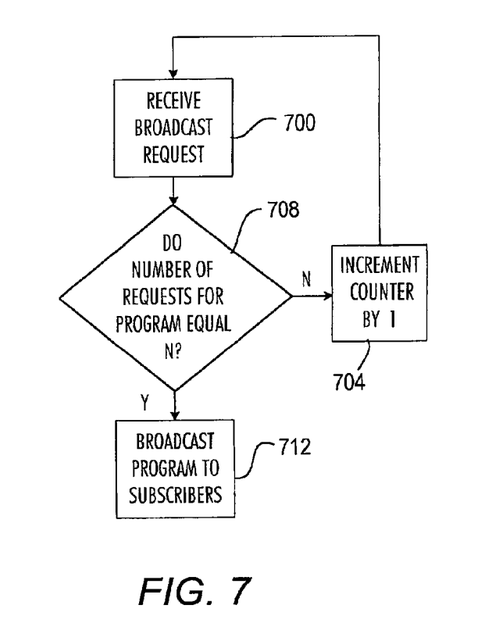
FIG. 7 depicts a methodology for caching programming according to another embodiment.

FIG. 7 depicts yet another embodiment of the present invention. Referring to FIG. 7, a group of interactive television network subscribers can obtain rebroadcasting, free or at a nominal charge, of a program. A network application in box 700 receives a broadcast request from a subscriber, typically electronically such as through email. The application increments in box 704 a program counter by one (the program counter now representing the number of prior requests for broadcasting of the program plus the newly received broadcast request) and determines in decision diamond 708 whether the program counter equals a predetermined number n. If not, the application returns to box 700 and awaits the receipt of the next request to broadcast the program. If so, the application in box 712 generates a command to another computational component of the network and/or to network management personnel to broadcast the program. A time and channel are selected for the broadcast and the interactive television network subscriber is suitably notified, such as through email or an on-screen message, of the scheduled time and channel. The number n is selected based on available network resources and broadcast costs. The program to be rebroadcast can be located, for example, in programming content data 148 and the time and channel for the rebroadcasting presented to subscribers (other than those requesting the rebroadcast) in television listing data 144. For example, the program could be recorded by an interactive television network component during broadcasting. In that event, a list of recorded programs could be accessible by interactive television network subscribers, such as through the television listing server 208.

Using the above methodology, a subscriber or group of subscribers could request a program to be recorded in the programming content data 148 for viewing at a later time. If the number of record requests exceed "n", the program would be recorded. The subscriber(s) could then be notified of the time and date of rebroadcasting or could record the select time and date of rebroadcasting. The available memory space of the server 212 may cause the interactive television network subscriber(s) to have only a limited time period in which to request broadcasting of the program.

Figure 8:
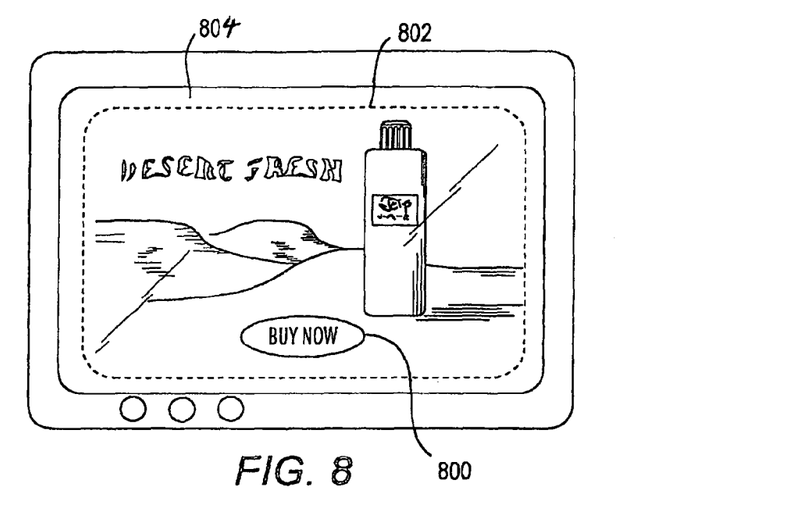
FIG. 8 depicts a television display for use in another embodiment.
Figure 9:
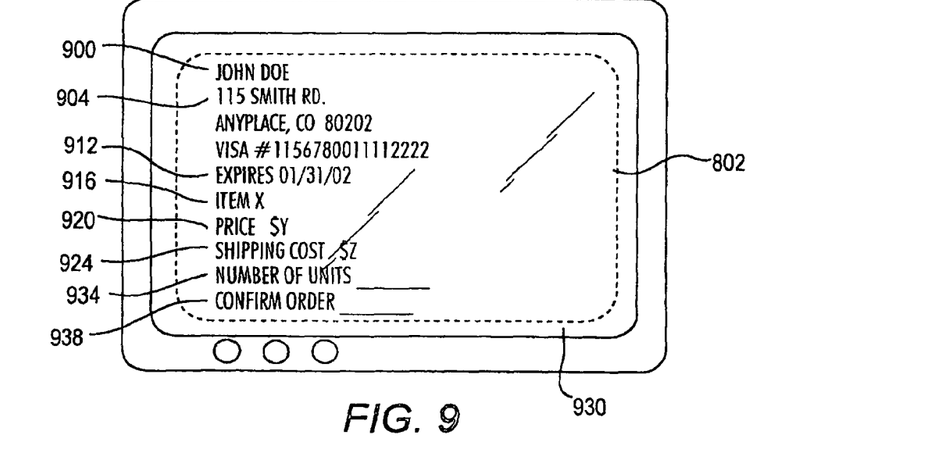
FIG. 9 depicts another television display for use in the embodiment.

FIGS. 8 and 9 depict another embodiment of the present invention. In this embodiment, a multimedia stream is forwarded to an interactive television network subscriber's STT 100 and the multimedia stream includes an embedded bug. STT 100 has logic to render the bug 800 in title save portion 802 of the television screen 804 along with the attached video information. For example, the video stream can be a program or advertisement and the bug a "buy now" command for goods and/or services referred to in the program or advertisement as shown in FIG. 8. If the interactive television network subscriber operates his remote control to activate the bug, the STT 100 upon receipt of the signal, sends a message over the network requesting an electronic form associated with the bug. For example, the bug could include a network address such as a Universal Resource Locator or URL where the electronic form may be retrieved. Typically, the server providing the form will be a service provider or vendor that is part of the interactive television network and not the internet. It is possible for the form to be located on a server of the network operator. In any event, the server forwards the form to the STT 100, and the STT 100 fills in the fields in the form using subscriber information located in the STT memory. Alternatively, the form could be embedded in the multimedia stream itself along with the bug in which event the STT 100 would not request the form and the bug may not directly reference a network address but rather the form. The form itself would have the network address to which the form would be sent. As will be appreciated, the form is rendered in any suitable language such as electronic commerce markup language or ECML embedded within hypertext markup language or HTML. As shown in FIG. 9, an application in the STT 100 enters information in one or more of the following fields in the form: a (first and last) name field 900, an address field 904, a credit or debit cart number field 908, an expiration date field 912, an item identification field 916, a price field 920, and a shipping charge field 924. The partially completed form is then rendered by the STT 100 as a picture 930 in the title save portion 802 of the subscriber's television. The subscriber edits the completed fields if necessary and completes the number of units field 934 and the confirm order field 938. When the confirm order field 938 is completed, the STT forwards the form to the server of the service provider and/or vendor to consummate the transaction. The address to which the form is to be sent is typically embedded in the form. The subscriber information is obtained by the STT when the STT is provisioned and/or initialized. The information is obtained from the interactive television network subscriber information maintained in the server 162 and/or is received by the STT from the subscriber after the STT is provisioned and maintained in nonvolatile memory of the STT. In the latter case, the STT would forward the information to the server 162.

Alternatively, the multimedia stream could be a program and the bug a request for recording the program on network memory space assigned to the interactive television network subscriber (as noted above). Alternatively, the bug could be a vote indicator to provide polling of interactive television network subscribers on a selected issue or candidate during programming. This application would be particularly useful for political polling of an issue or candidate.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. By way of example, the ordering or sequence of the steps may be reversed or rearranged in an order other than that set forth above. Steps may be omitted from the various processes described above. Interactive television network components described above can be omitted or replaced by other interactive television network components. One or more of the indices could be an intelligent index. In this configuration, the index would have logic that would have a search capability. The search engine for the database may therefore be unnecessary. In the description of the indices set forth above, the indices do not have logic and rely on the search engine for the performance of the search. The various network components could be consolidated or further subdivided or could be located in different parts of the network. For example, the data locator could be located in a central network location and not in each head end as discussed above. The set-top terminal may be discrete from or integral with the television Moreover, the teachings of the present invention are not limited to interactive television network networks but are extendible to any network offering good(s) or service(s) to subscribers or nonsubscribers. These and other changes may be made without departing from the spirit and scope of the present invention.

What is claimed is:

1. A method, comprising:
   transmitting, from a network via an interface of the network to a terminal of a plurality of terminals disposed at different locations, content including a network address associated with one or more storage devices in the network, wherein the network is in communication with an internet via at least one additional interface of the network;

receiving, in the network via the interface from the terminal, a request for data based on the network address;

communicating with the one or more storage devices in the network to retrieve one or more of at least three different types of data responsive to the request; and forwarding, to the terminal via the interface, the one or more of the at least three different types of data.

2. The method of claim 1, wherein the at least three different types of data are selected from:

listing data containing content scheduling information relating to past, current, and future scheduled interactive content;

content data containing audio and video content of previously transmitted content on the network;

email data containing email for users; and voice mail data containing voice mail information for users.

3. The method of claim 1, wherein the forwarding the one or more of at least three different types of data to the terminal comprises forwarding, from a data locator, the one or more of at least three different types of data to the terminal.

4. The method of claim 1, wherein the content comprises previously-transmitted audiovisual content.

5. The method of claim 1, wherein the content comprises broadcast content.

6. The method of claim 1, further comprising:

transcoding at least one of the at least three different types of data, wherein forwarding the one or more of at least three different types of data to the terminal comprises forwarding the transcoded at least one of the at least three different types of data.

7. The method of claim 1, wherein the network is an interactive television network.

8. A method comprising:

associating a network address with one or more storage devices in a network providing broadband services to a plurality of locations;

transmitting, within the network, a request for data based on the network address included in content sent from the network via an interface of the network to a terminal in one of the plurality of locations, wherein the network is in communication with an internet via at least one additional interface of the network; and receiving at least three different types of data responsive to the transmitted request.

9. The method of claim 8, comprising:

receiving a search request comprising a search term;

transmitting the search request; and responsive to the transmitted search request, receiving the content based at least in part on the search term.

10. The method of claim 9, comprising:

receiving an indication of one or more sources of the at least three different types of data to search; and transmitting the indication with the search request.

11. The method of claim 8, wherein the network is an interactive television network.

12. A method comprising:

transmitting to a terminal via an interface of a network providing services to a plurality of locations a stream comprising a network address associated with a database located in the network, wherein the network is in communication with an internet via at least one additional interface of the network;

transmitting instructions for configuring a first picture comprising at least one graphic associated with the network address to be rendered for display;

receiving a signal from the terminal relating to the at least one graphic;

transmitting the signal to the database located in the network associated with the network address; and responsive to the transmitted signal, receiving data from the database located in the network associated with the network address.

13. The method of claim 12, wherein the at least one graphic comprises a bug.

14. The method of claim 12, wherein the at least one graphic is associated with an offering of at least one of a good and a service.

15. The method of claim 12, further comprising:

receiving a user selection of the at least one graphic, wherein the signal is transmitted from the terminal responsive to the user selection of the at least one graphic.

16. The method of claim 12, wherein the received data comprises a form, the method further comprising:

populating the form with information stored at the terminal that is associated with a user of the terminal; and transmitting the populated form.

17. The method of claim 12, wherein the network address comprises a universal resource locator (URL).

18. The method of claim 12, wherein the stream comprises audiovisual content.

19. The method of claim 12, wherein the terminal comprises a set-top terminal, and wherein the at least one graphic comprises a graphical overlay on the stream.

20. The method of claim 12, wherein the network is an interactive television network.

* * * * *